United States Patent
Perley et al.

(10) Patent No.: US 9,605,558 B2
(45) Date of Patent: Mar. 28, 2017

(54) SYSTEM AND METHOD FOR PREVENTING EXCESSIVE LOADING ON A WIND TURBINE

(71) Applicant: General Electric Company, Schenectady, NY (US)

(72) Inventors: Thomas Franklin Perley, Simpsonville, SC (US); Brandon Shane Gerber, Charleston, SC (US); Arne Koerber, Berlin (DE)

(73) Assignee: General Electric Company, Schenectady, NY (US)

(*) Notice: Subject to any disclaimer, the term of this patent is extended or adjusted under 35 U.S.C. 154(b) by 716 days.

(21) Appl. No.: 13/970,930

(22) Filed: Aug. 20, 2013

(65) Prior Publication Data
US 2015/0056072 A1 Feb. 26, 2015

(51) Int. Cl.
| F04D 27/02 | (2006.01) |
| B64C 11/00 | (2006.01) |
| F01D 17/04 | (2006.01) |
| F03D 7/02 | (2006.01) |

(52) U.S. Cl.
CPC ........... F01D 17/04 (2013.01); F03D 7/0288 (2013.01); F05B 2260/821 (2013.01); F05B 2270/322 (2013.01); F05B 2270/404 (2013.01); F05B 2270/8042 (2013.01); Y02E 10/723 (2013.01)

(58) Field of Classification Search
CPC .. F01D 17/04; F03D 7/0288; F05B 2260/821; F05B 2270/322; F05B 2270/8042; Y02E 10/723
USPC ........................................................... 415/1
See application file for complete search history.

(56) References Cited

U.S. PATENT DOCUMENTS

| 7,175,389 B2 | 2/2007 | Moroz |
| 7,281,891 B2 | 10/2007 | Smith et al. |
| 7,342,323 B2 | 3/2008 | Avagliano et al. |
| 7,346,462 B2 | 3/2008 | Delmerico |
| 7,505,833 B2 | 3/2009 | Delmerico et al. |

(Continued)

FOREIGN PATENT DOCUMENTS

| DE | 2302206 A1 * | 3/2011 | ........... F03D 7/0204 |
| DK | GB 2476316 A * | 6/2011 | ........... F03D 7/0224 |

(Continued)

OTHER PUBLICATIONS

European search report issued in connection with corresponding EP Application No. 14180624.0 on Dec. 3, 2014.
EP Office Action, Jan. 5, 2017.

Primary Examiner — Nicholas J Weiss
Assistant Examiner — Ngoc T Nguyen
(74) Attorney, Agent, or Firm — Dority & Manning, P.A.

(57) ABSTRACT

Systems and methods for preventing excessive loading on a wind turbine are disclosed. The method includes: measuring an actual wind parameter upwind from the wind turbine using one or more sensors; providing the measured wind parameter to a processor; providing a plurality of wind turbine operating data to the processor; utilizing the plurality of operating data to determine an estimated wind turbine condition at the wind turbine; generating a control wind profile based on the actual wind parameter and the estimated wind turbine condition; and, implementing a control action based on the control wind profile to prevent excessive loading from acting on the wind turbine.

20 Claims, 8 Drawing Sheets

(56) References Cited

U.S. PATENT DOCUMENTS

| | | | |
|---|---|---|---|
| 7,613,548 B2 | 11/2009 | Cardinal et al. | |
| 7,822,560 B2 | 10/2010 | LeMieux | |
| 7,861,583 B2 | 1/2011 | Honhoff et al. | |
| 7,942,629 B2 | 5/2011 | Shi et al. | |
| 7,979,167 B2 | 7/2011 | Delmerico et al. | |
| 8,025,476 B2 * | 9/2011 | Zheng | F03D 7/0224 415/1 |
| 8,050,887 B2 | 11/2011 | Ahmann | |
| 8,257,040 B2 | 9/2012 | Chen et al. | |
| 2007/0075546 A1 * | 4/2007 | Avagliano | F03D 7/0224 290/44 |
| 2008/0086281 A1 * | 4/2008 | Santos | F03D 7/0292 702/127 |
| 2009/0047116 A1 | 2/2009 | Barbu et al. | |
| 2011/0140431 A1 * | 6/2011 | Landa | F03D 7/0224 290/44 |
| 2012/0128488 A1 * | 5/2012 | Kristoffersen | F03D 7/0224 416/31 |
| 2012/0263601 A1 * | 10/2012 | Baker | F03D 1/0641 416/223 R |
| 2013/0033040 A1 | 2/2013 | Bowyer et al. | |
| 2013/0156577 A1 | 6/2013 | Esbensen et al. | |
| 2013/0204447 A1 * | 8/2013 | Bjerge | F03D 11/0091 700/287 |
| 2014/0037447 A1 * | 2/2014 | Attia | F03D 7/048 416/1 |

FOREIGN PATENT DOCUMENTS

| | | | | |
|---|---|---|---|---|
| DK | WO 2013083130 A1 * | 6/2013 | | F03D 1/0633 |
| WO | 2012097814 A1 | 7/2012 | | |
| WO | WO 2012/103668 A1 | 8/2012 | | |

* cited by examiner

SYSTEM AND METHOD FOR PREVENTING EXCESSIVE LOADING ON A WIND TURBINE

FIELD OF THE INVENTION

The present invention relates generally to wind turbines, and more particularly, to systems and methods for preventing excessive loading from acting on a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Changes in atmospheric conditions, for example, wind speed, wind turbulence, wind gusts, wind direction, and density may significantly influence power produced by the generator. A power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. At wind speeds higher than a certain speed, typically referred to as a "trip limit" or "monitor set point limit," the wind turbine may implement a control action, such as shutting down or de-rating the wind turbine in order to protect wind turbine components from damage. A static rated power and static trip limit are typically determined during a design stage of the wind turbine and therefore are not dependent upon changing wind conditions that may be present during operation of the wind turbine, such as high wind turbulence intensity or sudden wind gusts.

Conventional systems and methods for controlling wind turbines during such transient wind conditions utilize one or more sensors positioned on the wind turbine to detect wind conditions. For example, a wind speed sensor positioned on the wind turbine will measure a wind gust at substantially the same time as the wind gust strikes the rotor blades. As such, wind turbine operation adjustments are subject to a time lag between measurement of the wind gust and the control action. As a result, the wind gust may cause rotor acceleration that will create excessive turbine loading and fatigue. In some instances, the wind gust may cause the rotor speed or power output to exceed a trip limit, before a wind turbine operation adjustment is completed, causing a wind turbine shut down.

Other systems and methods have utilized upwind measuring sensors, such as LIDAR sensors, to address the aforementioned time lag. As such, a change in wind acceleration may be measured upwind from the wind turbine, and the control action may be preemptively adjusted to compensate for the change in wind speed once the wind reaches the wind turbine. Still further control technologies estimate a wind condition experienced by the wind turbine using various algorithms. Inputs to such algorithms may change slowly causing a time lag between estimating the wind condition and implementing the control action.

Accordingly, an improved system and method for detecting a transient wind condition upwind of a wind turbine so as to reduce loads acting on the wind turbine would be desired in the art. Further, a system and method that incorporated existing hardware and software would be advantageous.

BRIEF DESCRIPTION OF THE INVENTION

Aspects and advantages of the invention will be set forth in part in the following description, or may be obvious from the description, or may be learned through practice of the invention.

In one aspect, a method for preventing excessive loading from acting on a wind turbine is disclosed. The method includes measuring an actual wind parameter upwind from the wind turbine using one or more sensors; providing the measured actual wind parameter to a processor; providing operating data indicative of current wind turbine operation to the processor; determining an estimated wind turbine condition at the wind turbine based at least partially on the operating data; generating a control wind profile based on the actual wind parameter and the estimated wind turbine condition; and, implementing a control action based on the control wind profile to prevent excessive loading from acting on the wind turbine.

In such an embodiment, the actual wind parameter and the estimated wind turbine condition may be reflective of any of the following: a wind gust, a wind speed, a wind direction, a wind acceleration, a wind turbulence, a wind shear, a wind veer, a wake, or similar such that the control wind profile reflects a direct comparison of the measured actual wind parameter and the estimated wind turbine condition.

In another embodiment, the method may include determining a future loading condition based at least partially on the actual wind parameter. Further, the method may further include determining a current loading condition based at least partially on the estimated wind turbine condition. As such, the method may then compare the current loading condition and the future loading condition and generate the control wind profile based at least partially on the comparison. In such an embodiment, the estimated wind turbine condition may be reflective of any of the following: a wind turbine thrust, a blade loading, a tower loading, a shaft loading, a nacelle loading, a hub loading or similar.

In another embodiment, the method may include implementing the control action when the control wind profile exceeds a predetermined threshold to protect the wind turbine from excessive loading. In addition, the control action may be a function of a magnitude of a difference between the control wind profile and the predetermined threshold. Alternatively, the control wind profile may represent an error between the actual wind parameter and the estimated wind turbine condition. As such, implementing the control action may be based on a magnitude of the error.

In various embodiments, the operating data may include a pitch angle, a generator speed, a power output, a torque output, an air density, a temperature, a pressure, or similar. Further, the step of measuring the actual wind parameter using one or more sensors may include utilizing at least one Light Detecting and Ranging (LIDAR) sensor. In still additional embodiments, the method may include utilizing one or more aerodynamic performance maps and one or more look-up tables to determine the estimated wind turbine condition.

Further, the control action as described herein may include at least one of: altering the pitch angle of a rotor blade, modifying a generator torque, modifying the generator speed, modifying the power output, yawing a nacelle of the wind turbine, braking one or more wind turbine components, activating an airflow modifying element on a rotor blade, or any other appropriate control action.

In another aspect, a method for preventing excessive loading from acting on a wind turbine is disclosed. The method includes measuring an actual wind parameter upwind of the wind turbine using one or more sensors; providing the measured actual wind parameter to a processor; determining an estimated future loading condition based at least partially on the measured actual wind parameter; and implementing a control action on the wind turbine based on the future loading condition to prevent excessive loading from acting on the wind turbine.

In another embodiment, the step of determining the future loading condition based at least partially on the actual wind parameter further includes utilizing one or more aerodynamic performance maps and one or more look-up tables. In another embodiment, the method may include implementing the control action when the future loading condition exceeds a predetermined threshold. Further, the method may include determining an error between the future loading condition and the predetermined threshold and implementing the control action based on a magnitude of the error to protect the wind turbine from excessive loading.

In still another aspect, a system for preventing excessive loading from acting on a wind turbine is disclosed. The system includes one or more sensors configured to measure an actual wind parameter upwind of the wind turbine; a processor communicatively coupled to the one or more sensors, and a controller communicatively coupled to the processor. The processor may be configured to: receive the measured actual wind parameter; receive operating data indicative of current wind turbine operation, determine an estimated wind turbine condition based on the operating data; and generate a control wind profile based on the actual wind parameter and the estimated wind turbine condition. The controller may then implement a control action based on the control wind profile to prevent excessive loading from acting on the wind turbine.

In further embodiments, the one or more sensors may include at least one Light Detecting and Ranging (LIDAR) sensor. Further, the processor may further include a wind turbine condition estimator. The wind turbine condition estimator having one or more aerodynamic performance maps and one or more look-up tables. As such, the one or more aerodynamic performance maps and the one or more look-up tables are configured to utilize the operating data to calculate the estimated wind turbine condition.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
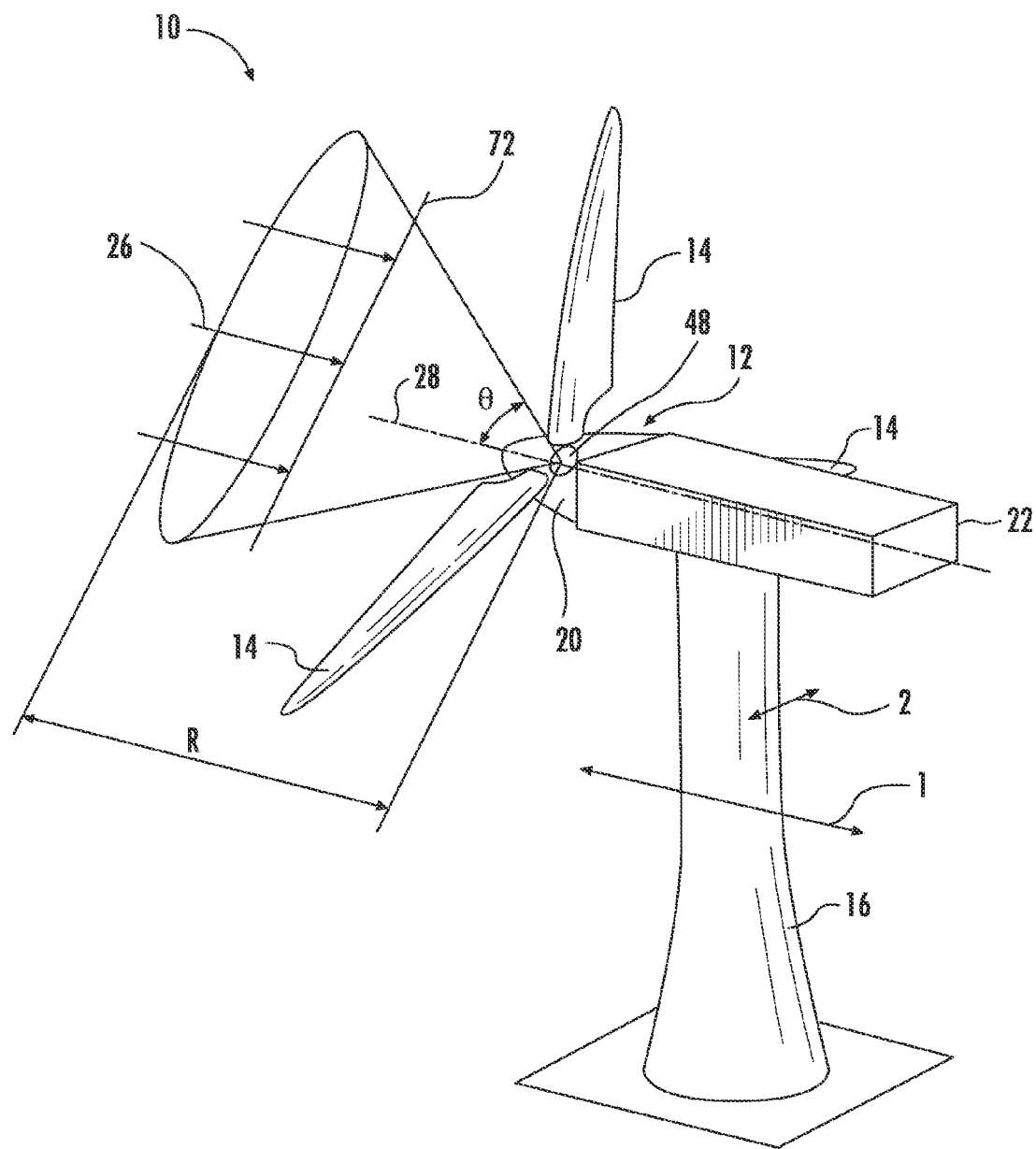
FIG. 1 a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for preventing excessive loading from acting on a wind turbine by detecting a wind condition before it reaches the wind turbine and implementing a corresponding corrective action. More specifically, one or more sensors may be used to detect an actual wind parameter upwind of the wind turbine. For example, in several embodiments, one or more Light Detecting and Ranging (LIDAR) sensors may be used to detect the actual wind parameter, such as a wind gust, a wind speed, a wind direction, a wind acceleration, a wind turbulence, a wind shear, a wind veer, a wake, or similar. Further, operating data indicative of current wind turbine operation are also provided to a processor to determine an estimated wind turbine condition. The plurality of wind turbine operating data may include: a pitch angle, a generator speed, a power output, a torque output, an air density, a temperature, a pressure, or similar. In one embodiment, the estimated wind turbine condition may be representative of a wind gust, a wind speed, a wind direction, a wind acceleration, a wind turbulence, a wind shear, a wind veer, a wake, or similar. In an alternative embodiment, the estimated wind turbine condition may be representative of a wind turbine thrust, a blade loading, a tower loading, a shaft loading, a nacelle loading, a hub loading, or similar. The method then generates a control wind profile based on the actual wind parameter and the estimated wind turbine condition. In one embodiment, for example, a transient wind condition, such as a wind gust, may be detected when the control wind profile exceeds a predetermined threshold. Alternatively, a transient wind condition may be detected when an error between the actual wind parameter and the estimated wind turbine condition is of a certain magnitude. Accordingly, the system and method may implement a control action to protect the wind turbine from excessive loading due to the transient wind condition.

Referring now to the drawings, FIG. 1 illustrates a wind turbine 10 in accordance with aspects of the present disclosure. The wind turbine 10 comprises a rotor 12 having a plurality of wind turbine blades 14 mounted on a hub 20. The wind turbine 10 also comprises a nacelle 22 that is mounted atop a tower 16. The rotor 12 is operatively coupled to an electrical generator via drive train (not shown) housed within the nacelle 22. The tower 16 exposes the blades 14 to the wind (directionally represented by arrow 26), which causes the blades 14 to rotate about an axis 28. The blades 14 transform the kinetic energy of the wind into a rotational torque, which is further transformed into electrical energy via the electrical generator.

Figure 2:
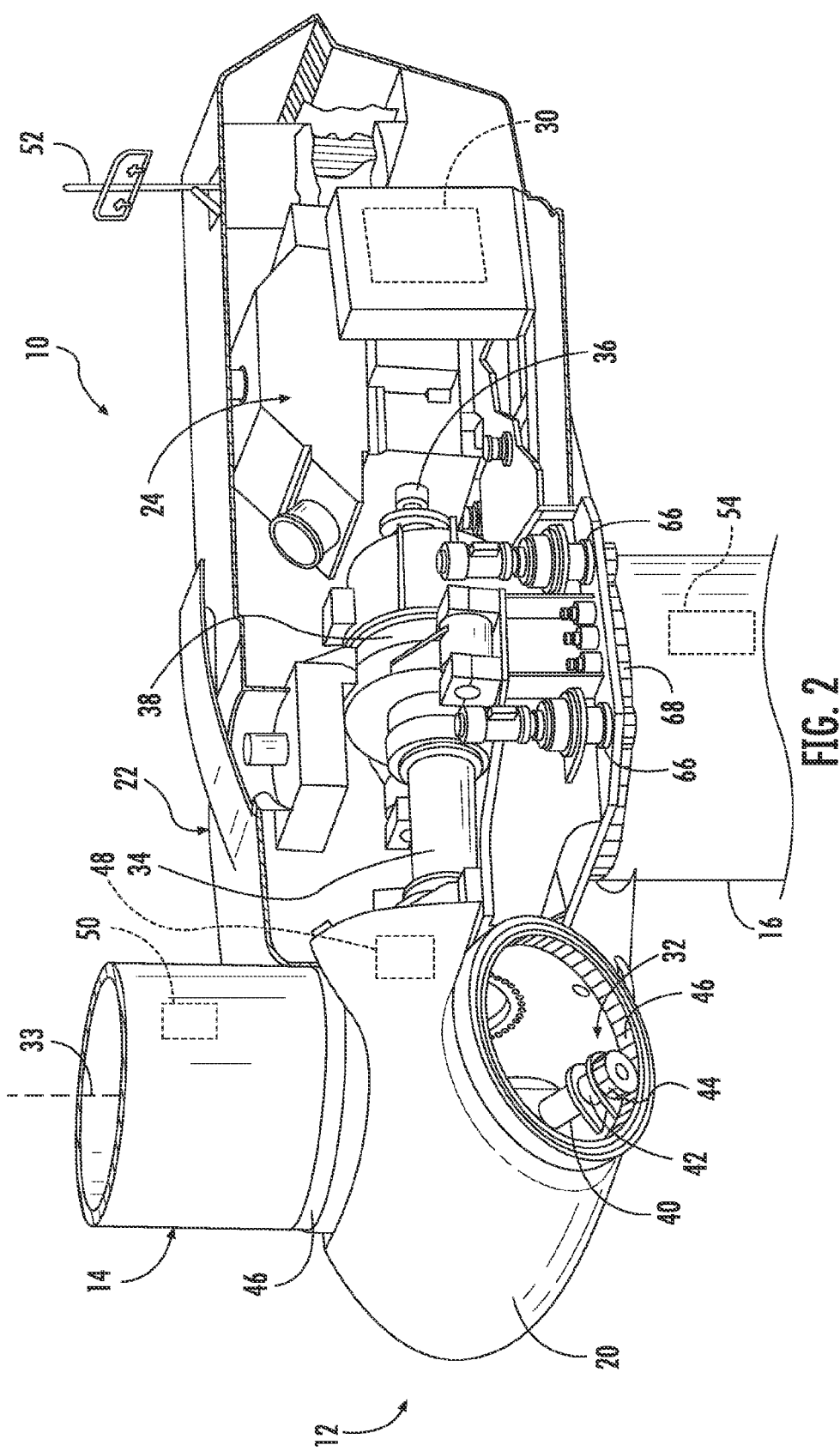
FIG. 2 illustrates a simplified, internal view of one embodiment of a nacelle of a wind turbine.

Referring now to FIG. 2, a simplified, internal view of one embodiment of the nacelle 22 of the wind turbine 10 shown in FIG. 1 is illustrated. As shown, a generator 24 may be disposed within the nacelle 22. In general, the generator 24 may be coupled to the rotor 12 for producing electrical power from the rotational energy generated by the rotor 12. For example, as shown in the illustrated embodiment, the rotor 12 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 14 and the hub 20. The gearbox 38 may then be configured to convert the low speed, high torque input to a high speed, low torque output to drive the generator shaft 36 and, thus, the generator 24.

The wind turbine 10 may also include a controller 30 centralized within the nacelle 22. Alternatively, the controller 30 may be located within any other component of the wind turbine 10 or at a location outside the wind turbine. Further, the controller 30 may be communicatively coupled to any number of the components of the wind turbine 10 in order to control the operation of such components and/or implement various correction actions as described herein. As such, the controller 30 may include a computer or other suitable processing unit. Thus, in several embodiments, the controller 30 may include suitable computer-readable instructions that, when implemented, configure the controller 30 to perform various different functions, such as receiving, transmitting and/or executing wind turbine control signals. Accordingly, the controller 30 may generally be configured to control the various operating modes (e.g., start-up or shut-down sequences), de-rate the wind turbine, and/or control various components of the wind turbine 10 as will be discussed in more detail below.

Still referring to FIG. 2, each rotor blade 14 may also include a pitch adjustment mechanism 32 configured to rotate each rotor blade 14 about its pitch axis 33. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 14 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 14 about the pitch axis 33. Similarly, the wind turbine 10 may include one or more yaw drive mechanisms 66 communicatively coupled to the controller 30, with each yaw drive mechanism(s) 66 being configured to change the angle of the nacelle 22 relative to the wind (e.g., by engaging a yaw bearing 68 of the wind turbine 10).

Figure 3:
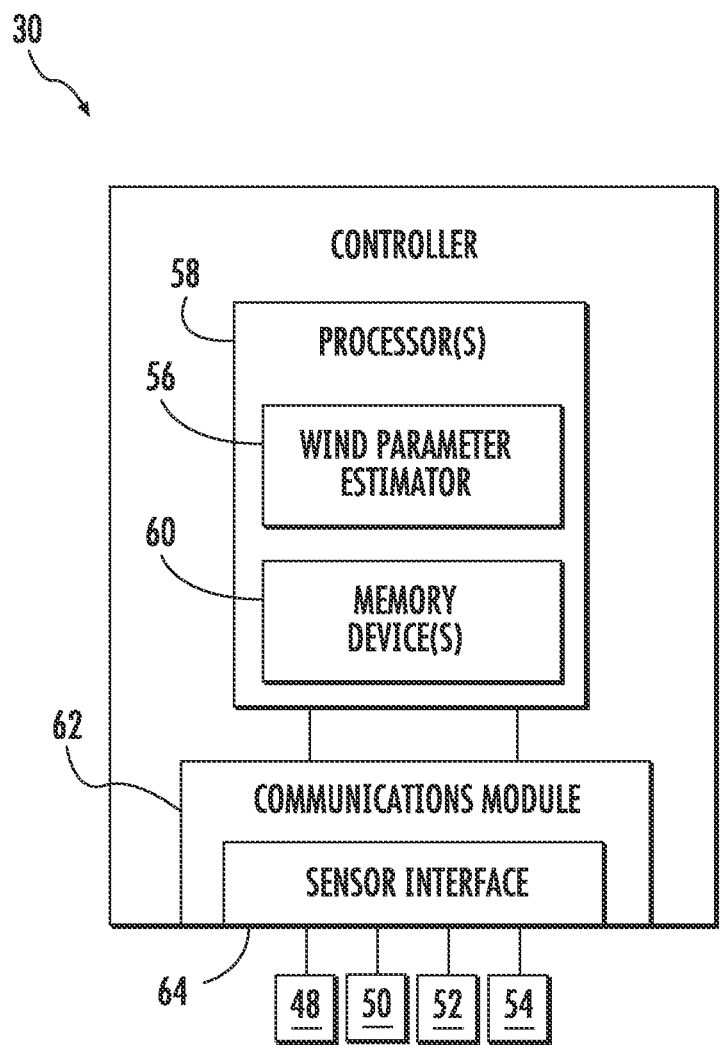
FIG. 3 illustrates a schematic diagram of one embodiment of a controller according to the present disclosure.

Referring to FIGS. 1-3, the wind turbine 10 may include one or more sensors 48, 50, 52, 54 for measuring various wind parameters upwind of the wind turbine 10. For example, as shown in FIG. 1, sensor 48 is located on the hub 20 so as to measure an actual wind parameter upwind from the wind turbine 10. The actual wind parameter may be any of the following: a wind gust, a wind speed, a wind direction, a wind acceleration, a wind turbulence, a wind shear, a wind veer, a wake, or similar. Further, the one or more sensors may include at least one LIDAR sensor for measuring upwind parameters. For example, as shown in FIG. 1, LIDAR sensor 48 is a measurement radar configured to scan an annular region around the wind turbine 10 and measure wind speed based upon reflection and/or scattering of light transmitted by the LIDAR sensor from aerosol. The cone angle ($\theta$) and the range (R) of the LIDAR sensor 48 may be suitably selected to provide a desired accuracy of measurement as well as an acceptable sensitivity. In the illustrated embodiment, the LIDAR sensor 48 is located on the hub 20 whereupon the blades 14 are mounted. In further embodiments, the one or more LIDAR sensors may also be located near the base of the wind turbine tower 16, on one or more of the wine turbine blades, on the nacelle, one a meteorological mast of the wind turbine, or at any other suitable location. In still further embodiments, the LIDAR sensor 48 may be located in any suitable location on or near the wind turbine 10. Further, the LIDAR sensor 48 may be configured to measure a wind parameter ahead of at least one specific portion, typically the most significant sections of the blades 14 in terms of contributions of those sections to aerodynamic torque on the blades 14. These sections may include, for example, sections close to the tip of the blade. The points ahead of the blades 14 at which wind speed is measured by the LIDAR sensor 48 is represented by plane 72 as shown in FIG. 1.

In alternative embodiments, the sensors 48, 50, 52, 54 may be any other suitable sensors capable of measuring wind parameters upwind of the wind turbine 10. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 48, 50, 52, 54 may, for example, be used to generate signals relating to the parameter being monitored, which can then be utilized by the controller 30 to determine the actual condition.

Referring specifically to FIG. 3, there is illustrated a block diagram of one embodiment of the controller 30 according to the present disclosure. As shown, the controller 30 may include one or more processor(s) 58, a wind turbine condition estimator 56, and associated memory device(s) 60 configured to perform a variety of computer-implemented functions (e.g., performing the methods, steps, calculations and the like and storing relevant data as disclosed herein). Additionally, the controller 30 may also include a communications module 62 to facilitate communications between the controller 30 and the various components of the wind turbine 10. Further, the communications module 62 may include a sensor interface 64 (e.g., one or more analog-to-digital converters) to permit signals transmitted from the sensors 48, 50, 52, 54 to be converted into signals that can be understood and processed by the processors 58. It should be appreciated that the sensors 48, 50, 52, 54 may be communicatively coupled to the communications module 62 using any suitable means. For example, as shown in FIG. 3, the sensors 48, 50, 52, 54 are coupled to the sensor interface 64 via a wired connection. However, in other embodiments, the sensors 48, 50, 52, 54 may be coupled to the sensor interface 64 via a wireless connection, such as by using any suitable wireless communications protocol known in the art. As such, the processor 58 may be configured to receive one or more signals from the sensors 48, 50, 52, 54.

The wind turbine condition estimator 56 may be considered software that utilizes the plurality of operating data to calculate, in real-time, the estimated wind turbine condition. Further, the wind turbine condition estimator 56 may comprise firmware that includes the software, which may be executed by the processor 58. Further, the wind turbine condition estimator 56 may be in communication with the various sensors and devices of the wind turbine 10, which may provide the plurality of operating data to the wind turbine condition estimator 56.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 30 to perform various functions including, but not limited to, estimating one or more wind parameters of the wind turbine 10 based on the plurality of operating data, transmitting suitable control signals to implement control actions in response to the detection of transient wind conditions and various other suitable computer-implemented functions.

Figure 4:
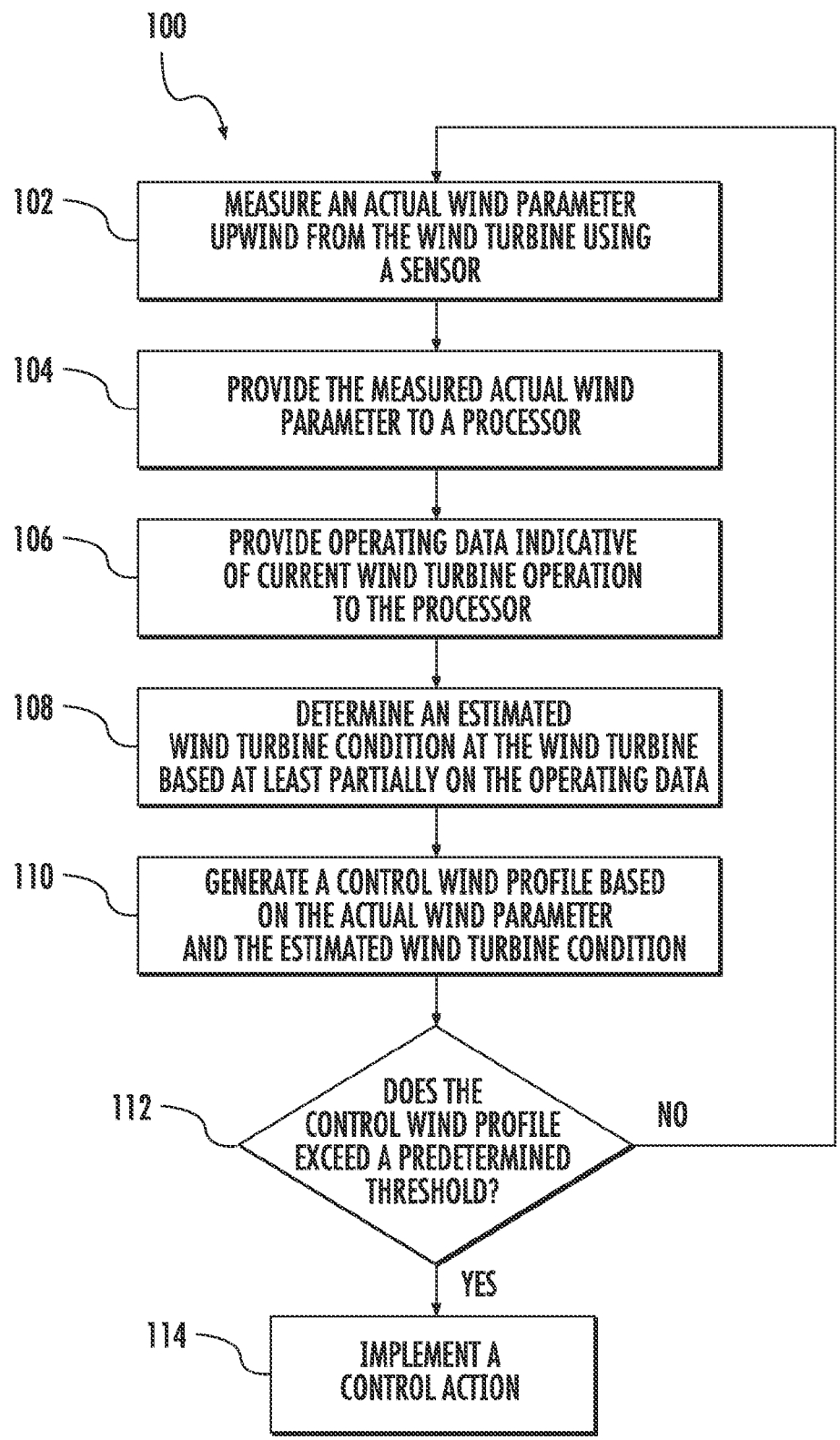
FIG. 4 illustrates a flow diagram of one embodiment of a method according to the present disclosure.
Figure 5:
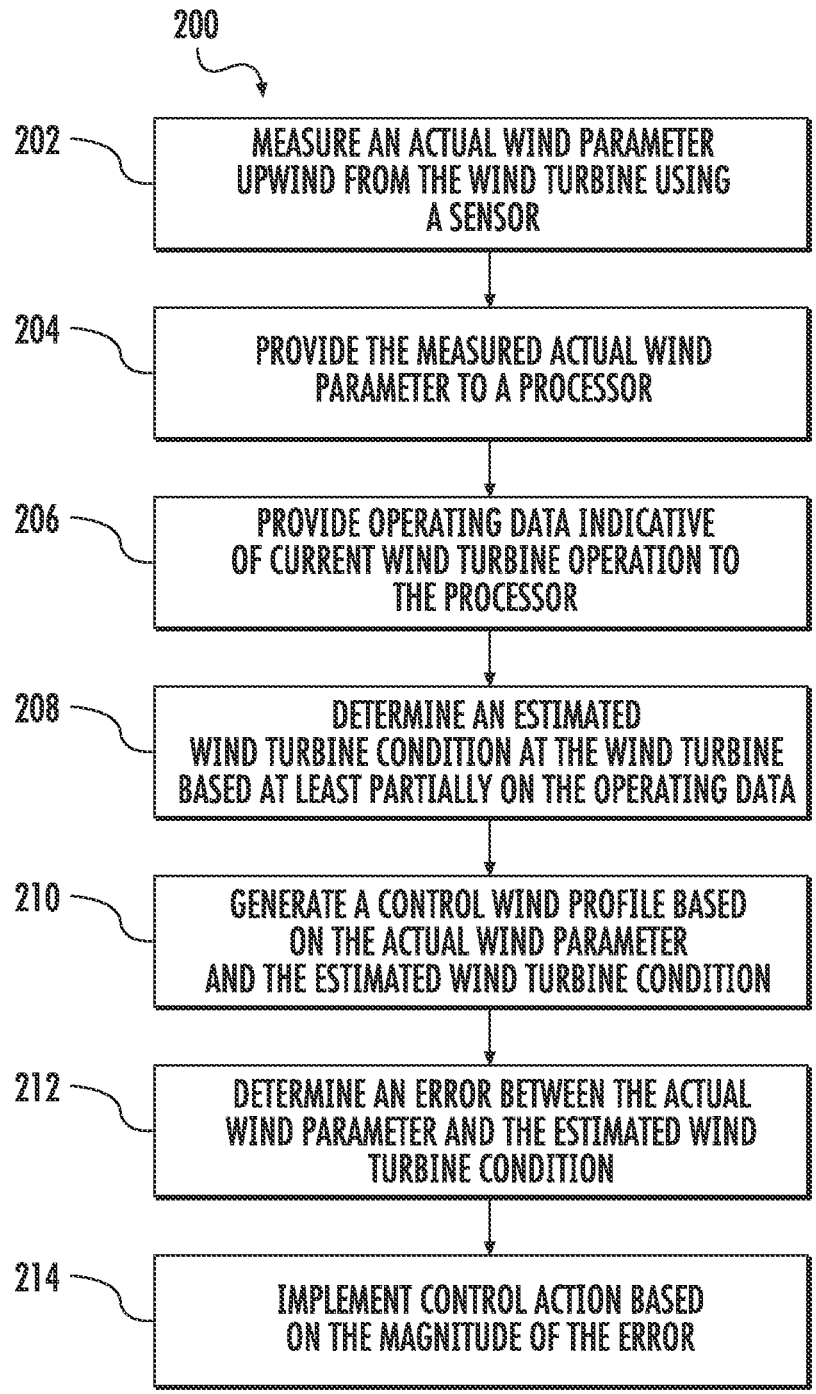
FIG. 5 illustrates a flow diagram of another embodiment of a method according to the present disclosure.

Referring now to FIGS. 4-5, several flow diagrams are depicted to illustrate various embodiments of the present disclosure. As shown in the embodiment illustrated in FIG. 4, a method 100 includes step 102 of measuring an actual wind parameter upwind from the wind turbine 10 using a sensor. The next step 104 includes providing the measured actual wind parameter to the processor 58. Further, the method 100 includes a step 106 of providing operating data indicative of current wind turbine operation to the processor 58. A next step 108 includes determining an estimated wind turbine condition at the wind turbine 10 based at least partially on the operating data. Further, the method includes step 110 of generating a control wind profile based on the actual wind parameter and the estimated wind turbine condition. The controller may then implement a control action based on the control wind profile (step 114). More specifically, as shown, if the control wind profile exceeds a predetermined threshold, then the controller may implement the correction action (step 114). Alternatively, if the control wind profile is below the predetermined threshold, then the method 100 is repeated beginning with step 102. In various embodiments, the predetermined threshold may be preprogrammed within the controller 30. Further, the predetermined threshold may be a constant threshold or may vary with wind speed and/or other operating parameters.

Referring now FIG. 5, method 200 includes steps 202, 204, 206, 208, and 210, which are similar to the embodiment of FIG. 4. Rather than implementing a control action based on the predetermined threshold, however, the method 200 determines an error between the actual wind parameter and the estimated wind turbine condition (step 212). The method 200 then implements the control action based on the magnitude of the error (step 214). In such an embodiment, the predetermined threshold may be eliminated.

In each of the embodiments described above, the wind turbine condition estimator 56 may be configured to determine the estimated wind turbine condition as described herein. For example, in one embodiment, the wind turbine condition estimator 56 receives the operating data which may consist of any of the following: a pitch angle, a generator speed, a power output, a torque output, a temperature, a pressure, a tip speed ratio, an air density, or other similar operation condition. The wind turbine condition estimator 56 then calculates the estimated wind turbine condition as a function of various combinations of the operating data. In one embodiment, for example, the wind turbine condition estimator 56 may implement a control algorithm having a series of equations to determine the estimated wind turbine condition as a function of the pitch angle, the generator speed, the power output, and the air density. Further, the equations may be solved using the operating data and one or more aerodynamic performance maps. In one embodiment, the aerodynamic performance maps are dimensional or non-dimensional tables that describe rotor loading and performance (e.g. power, thrust, torque, or bending moment, or similar) under given conditions (e.g. density, wind speed, rotor speed, pitch angles, or similar). As such, the aerodynamic performance maps may include: power coefficient, thrust coefficient, torque coefficient, and/or partial derivatives with respect to pitch angle, rotor speed, or tip speed ratio. Alternatively, the aerodynamic performance maps can be dimensional power, thrust, and/or torque values instead of coefficients.

Further, the wind turbine estimator 56 may also include one or more look-up tables (LUTs). In various embodiments, at least some of the LUTs may include: a wind turbine thrust, a blade loading, a tower loading, a shaft loading, a nacelle loading, a hub loading, or any other wind turbine loading condition. As such, depending on the embodiment, the estimated wind turbine condition may be representative of wind parameters near the wind turbine or loading conditions of the wind turbine. As mentioned, the wind parameters may include a wind gust, a wind speed, a wind direction, a wind acceleration, a wind turbulence, a wind shear, a wind veer, a wake, or similar. Loading conditions may include a wind turbine thrust, a blade loading, a tower loading, a shaft loading, a nacelle loading, a hub loading, or similar. The wind turbine condition estimator 56 then provides or communicates the estimated wind turbine condition to the processor 58.

Once the estimated wind turbine condition is calculated, the processor 58 may use the estimated wind turbine condition in various ways. For example, in one embodiment, where the estimated wind turbine condition is reflective of a wind parameter, the estimated wind turbine condition may be compared to the actual wind parameter directly to generate the control wind profile. Alternatively, where the estimated wind turbine condition represents a current turbine loading condition, the actual wind parameter may be used to determine a future loading condition, such that the current and future loading conditions may be compared. More specifically, the actual wind parameter may be used in combination with the aerodynamic performance maps and/or LUTs of the wind turbine condition estimator 56 to determine the future loading condition. In such an embodiment, the current loading condition and the future loading condition are compared and the control wind profile may be generated based at least partially on the comparison.

Figure 6:
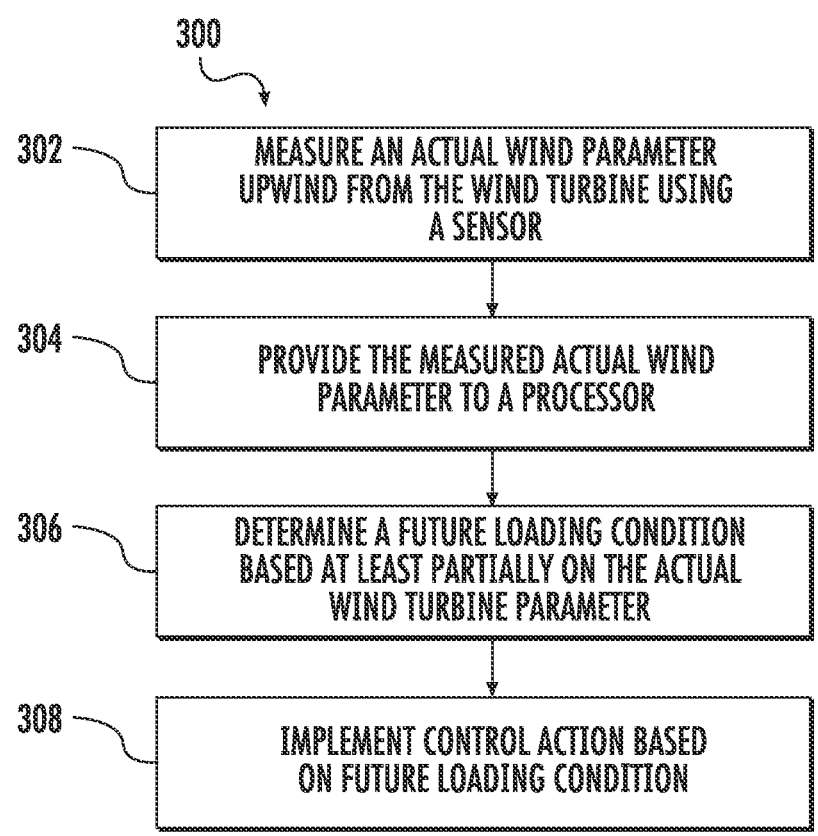
FIG. 6 illustrates a flow diagram of yet another embodiment of a method according to the present disclosure.

In still another embodiment, the processor 58 may use only the actual wind parameter and the aerodynamic performance maps and/or LUTs to calculate the future loading condition. In other words, determining the estimated wind turbine condition may be eliminated altogether. This embodiment may be further understood with respect to method 300 illustrated in FIG. 6. As shown, the method 300 includes measuring an actual wind parameter upwind from the wind turbine 10 using a sensor (step 302). A next step 304 includes providing the actual wind parameter to the processor 58. Further, the method 300 includes determining a future loading condition based at least partially on the actual wind turbine parameter (step 306). In this embodiment, the controller 30 may then implement a control action based on the future loading condition (step 308). Such an embodiment is capable of reducing loads acting on the wind turbine without utilizing current loading conditions (i.e. the estimated wind turbine condition).

The control action(s) as described herein may be any suitable control action so as to reduce loads acting on the wind turbine. For example, in several embodiments, the control action may include temporarily de-rating or up-rating the wind turbine to permit the loads acting on or more of the wind turbine components to be reduced or otherwise controlled. Up-rating the wind turbine, such as by up-rating torque, may temporarily slow down the wind turbine and act as a brake to help reduce loads. De-rating the wind turbine may include speed de-rating, torque de-rating or a combination of both. Further, the wind turbine may be de-rated by reducing speed and increasing torque, which can be beneficial so as to maintain power. In another embodiment, the wind turbine 10 may be de-rated by pitching one or more of the rotor blades 14 about its pitch axis 33. More specifically, the controller 30 may generally control each pitch adjustment mechanism 32 in order to alter the pitch angle of each rotor blade 14 between −10 degrees (i.e., a power position of the rotor blade 14) and 90 degrees (i.e., a feathered position of the rotor blade 14). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 30 by transmitting a suitable control signal/command to the generator 24 in order to modulate the magnetic flux produced within the generator 24.

The wind turbine 10 may also be temporarily de-rated by yawing the nacelle 22 to change the angle of the nacelle 22 relative to the direction of the wind. In other embodiments, the controller 30 may be configured to actuate one or more mechanical brake(s) or activate an airflow modifying element on a rotor blade in order to reduce the rotational speed and/or load of the rotor blades 14, thereby reducing component loading. In still further embodiments, the controller 30 may be configured to perform any appropriate control action known in the art. Further, the controller 30 may implement a combination of two or more control actions.

Figure 7:
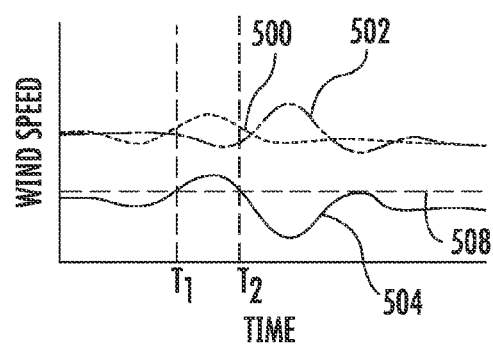
FIG. 7 illustrates a graph of one embodiment of a control wind profile compared to a predetermined threshold according to the present disclosure.
Figure 8:
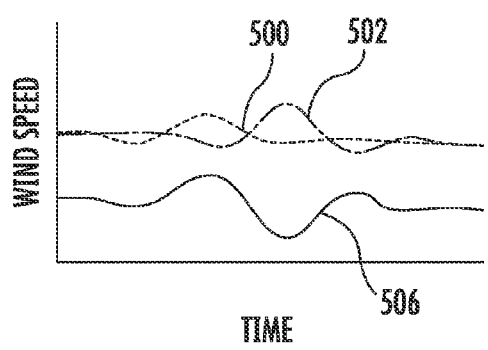
FIG. 8 illustrates a graph of one embodiment of a control wind profile based on an error between an actual wind parameter and an estimated wind turbine condition according to the present disclosure.

The system and method described herein may be better understood with reference to FIGS. 7-11, which illustrate a plurality of graphs according to the present disclosure. For purposes of example only, graphs 7-8 are illustrative of the actual wind parameter and the estimated wind turbine parameter being indicative of wind speed. As shown in FIG. 7, curve 500 illustrates the actual wind speed as obtained from a LIDAR sensor, whereas curve 502 illustrates the estimated wind speed (e.g. as determined by the wind turbine condition estimator 56). Curve 504 illustrates the control wind profile (e.g. a comparison) based on the actual wind speed and the estimated wind speed. Curve 508 represents a predetermined threshold, which is typically reflective of an allowable design load. As mentioned, the processor 58 may be configured to determine if the control wind profile 504 exceeds the predetermined threshold 508, and if it does, the controller may implement an appropriate control action. As illustrated, the control wind profile 504 exceeds the predetermined threshold 508 between time $T_1$ and $T_2$, thereby indicating that a transient wind condition is likely occurring. As such, an appropriate control action may be implemented so as to prevent excessive loading from acting on the wind turbine. FIG. 8 illustrates the same actual wind speed 500 and the same estimated wind speed 502, however, the control wind profile 506 is based on an error between the actual wind speed and the estimated wind speed, such that the wind turbine may be controlled based on the error. As such, the predetermined threshold may be eliminated.

Figure 9:
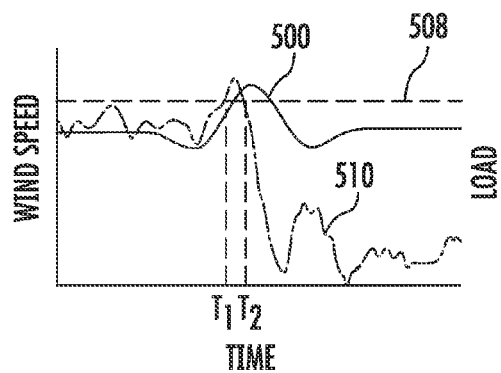
FIG. 9 illustrates a graph of one embodiment of controlling a load acting on a wind turbine based on a future loading condition according to the present disclosure.

Referring now to FIG. 9, various advantages of controlling the wind turbine based on a future loading condition is illustrated. As shown, curve 500 again illustrates the actual wind speed. Curve 510 illustrates the estimated future loading experienced by the wind turbine. Curve 508 illustrates a predetermined threshold set to prevent excessive loading from acting on the wind turbine. At time $T_1$, the system recognizes that the future loading condition is likely to exceed the predetermined threshold. As such, the system implements appropriate control action, wherein the load 510 is reduced below the predetermined threshold. Such an embodiment illustrates an advantage of predicting a future loading condition based on the actual wind parameter and controlling the wind turbine based on the future loading condition. In other words, in one embodiment, the present disclosure is capable of preventing excessive loading from acting on the wind turbine without utilizing current loading conditions (i.e. the estimated wind turbine condition).

Figure 10:
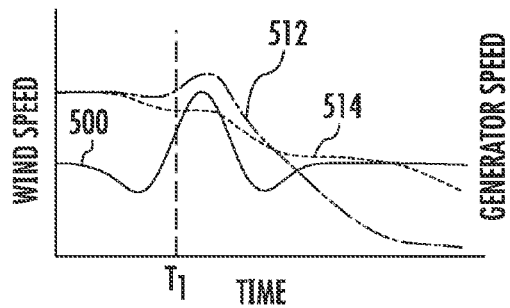
FIG. 10 illustrates a graph of one embodiment of controlling a load acting on the wind turbine by de-rating the generator speed according to the present disclosure; and, FIG. 11 illustrates a graph of another embodiment of controlling a load acting on a wind turbine according to the present disclosure.
Figure 11:
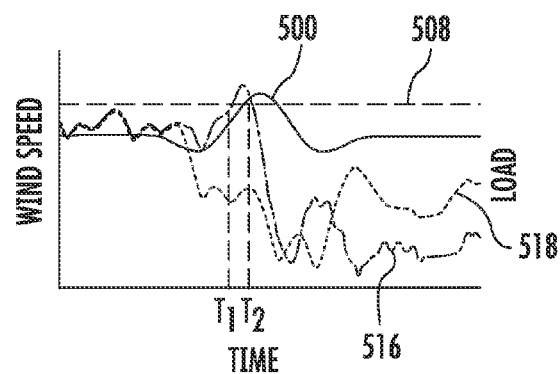

Referring now to FIGS. 10 and 11, the graph illustrates various advantages of the present disclosure in regards to generator speed and wind turbine component loading. As shown, the actual wind speed 500 begins to increase prior to time $T_1$, which indicates that a transient wind condition is occurring. Curve 512 illustrates the generator speed of the wind turbine without any control technology to detect a transient wind condition. Curve 514 represents the generator speed of a wind turbine implementing the control technology of the present disclosure. As shown in reference to baseline curve 512, the generator speed increases due the transient wind condition, thereby causing a corresponding increase in wind turbine component loading 516 (FIG. 11), which may cause damage to various wind turbine components. In contrast, curves 514 and 518 illustrate an advantage of implementing the control technology of the present disclosure. As shown, the wind turbine condition estimator 56 as described herein detected the increase in actual wind speed early and implemented an appropriate control action before it reached the wind turbine to avoid potential damage caused by excess loading. More specifically, the present disclosure decreased generator speed (curve 514) before the increase in actual wind speed reached the wind turbine, thereby preventing the corresponding loading (curve 510) from increasing above design loads.

It should also be appreciated that an advantage of the present invention is that the system and method may be implemented using existing components of the wind turbine 10. As such, a user is not required to purchase, install, and maintain new equipment. Further, the controller 30 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for proactively preventing excessive loading from acting on a wind turbine, the method comprising:
   measuring an actual wind parameter upwind from the wind turbine using one or more sensors;
   providing the measured actual wind parameter to a processor having a wind turbine condition estimator stored therein, the wind turbine condition estimator comprising a control algorithm having a series of equations stored therein;
   providing operating data indicative of current wind turbine operation to the processor, the operating data comprising at least one of a pitch angle, a generator speed, a power output, and an air density;
   solving, via the wind turbine condition estimator, the series of equations using the operating data and one or more aerodynamic performance maps;
   determining an estimated wind turbine condition at the wind turbine based-on the solved equations, wherein the estimated wind turbine condition includes one or more of wind parameters near the wind turbine, and wherein the wind parameters include a wind gust, a wind speed, a wind direction, a wind acceleration, a wind turbulence, a wind shear, a wind veer, or a wake;
   generating a control wind profile from the actual wind parameter and the estimated wind turbine condition; and,
   implementing a control action based on the control wind profile to prevent excessive loading from acting on the wind turbine.

2. The method of claim 1, further comprising determining a future loading condition based at least partially on the actual wind parameter.

3. The method of claim 2, further comprising determining a current loading condition based at least partially on the estimated wind turbine condition.

4. The method of claim 3, further comprising comparing the current loading condition and the future loading condition and generating the control wind profile based at least partially on the comparison.

5. The method of claim 1, further comprising implementing the control action when the control wind profile exceeds a predetermined threshold to reduce the loads acting on the wind turbine.

6. The method of claim 5, wherein the control action is a function of a magnitude of a difference between the control wind profile and the predetermined threshold.

7. The method of claim 1, wherein the control wind profile represents an error between the actual wind parameter and the estimated wind turbine condition, and wherein implementing the control action is based on the magnitude of the error.

8. The method of claim 1, wherein the operating data comprises any combination of the following: a pitch angle, a generator speed, a power output, a torque output, an air density, a temperature, and a pressure.

9. The method of claim 1, wherein measuring the actual wind parameter using one or more sensors comprises utilizing at least one Light Detecting and Ranging (LIDAR) sensor.

10. The method of claim 1, wherein the actual wind parameter and the estimated wind turbine condition are reflective of at least one of the following: a wind gust, a wind speed, a wind direction, a wind acceleration, a wind turbulence, a wind shear, a wind veer, or a wake.

11. The method of claim 1, wherein the estimated wind turbine condition is reflective of at least one of the following: a wind turbine thrust, a blade loading, a tower loading, a shaft loading, a nacelle loading, or a hub loading.

12. The method of claim 1, wherein the wind condition estimator further comprises one or more look-up tables stored therein.

13. The method of claim 1, wherein the control action comprises at least one of altering the pitch angle of a rotor blade, modifying a generator torque, modifying the generator speed, modifying the power output, yawing a nacelle of the wind turbine, braking one or more wind turbine components, or activating an airflow modifying element on a rotor blade.

14. A method for proactively preventing excessive loading from acting on a wind turbine, the method comprising:
   measuring an actual wind parameter upwind from the wind turbine using one or more sensors;
   providing the measured actual wind parameter to a processor having a wind turbine condition estimator stored therein, the wind turbine condition estimator comprising a control algorithm having a series of equations stored therein;

providing operating data indicative of current wind turbine operation to the processor, the operating data comprising at least one of a pitch angle, a generator speed, a power output, and an air density;

solving, via the wind turbine condition estimator, the series of equations using the operating data and at least one of one or more aerodynamic performance maps or one or more lookup tables;

determining a future loading condition based at least partially on the measured actual wind parameter and the solved equations, wherein the future loading condition includes a wind turbine thrust, a blade loading, a tower loading, a shaft loading, a nacelle loading, or a hub loading; and, implementing a control action based on the future loading condition to prevent excessive loading from acting on the wind turbine.

15. The method of claim 14, further comprising implementing the control action when he future loading condition exceeds a predetermined threshold.

16. The method of claim 15, further comprising determining an error between the future loading condition and the predetermined threshold and implementing the control action based on a magnitude of the error to reduce loads acting on the wind turbine.

17. The method of claim 14, wherein determining the future loading condition based at least partially on the actual wind parameter further comprises utilizing one or more aerodynamic performance maps and one or more look-up tables.

18. A system for preventing excessive loading from acting on a wind turbine, the system comprising:

one or more sensors configured to measure an actual wind parameter upwind of the wind turbine;

a processor communicatively coupled to the one or more sensors, the processor comprising a wind turbine condition estimator having a control algorithm with a series of equations stored therein, the processor configured to:

receive the measured actual wind parameter;

receive operating data indicative of current wind turbine operation, the operating data comprising at least one of a pitch angle, a generator speed, a power output, and an air density;

solve, via the wind turbine condition estimator, the series of equations using the operating data and one or more aerodynamic performance maps;

determine an estimated wind turbine condition a the wind turbine based on the solved equations, wherein the estimated wind turbine condition includes one or more of loading conditions and wind parameters near the wind turbine, and wherein the wind parameters include a wind gust, a wind speed, a wind direction, a wind acceleration, a wind turbulence, a wind shear, a wind veer, or a wake, and wherein the loading conditions include a wind turbine thrust, a blade loading, a tower loading, a shaft loading, a nacelle loading, or a hub loading;

generate a control wind profile based on the measured actual wind parameter and the estimated wind turbine condition; and, a controller communicatively coupled to the processor, wherein the controller is configured to implement a control action based on the control wind profile to prevent excessive loading from acting on the wind turbine.

19. The system of claim 18, wherein the one or more sensors comprises at least one Light Detecting and Ranging (LIDAR) sensor.

20. The system of claim 18, wherein the wind turbine condition estimator further comprises one or more look-up tables stored therein.

* * * * *